(12) United States Patent
Teegan

(10) Patent No.: US 10,176,635 B2
(45) Date of Patent: *Jan. 8, 2019

(54) SAVING AUGMENTED REALITIES

(75) Inventor: Hugh Teegan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/536,708

(22) Filed: Jun. 28, 2012

(65) Prior Publication Data

US 2014/0002490 A1 Jan. 2, 2014

(51) Int. Cl.
*G06F 3/01* (2006.01)
*G02B 27/01* (2006.01)
*G06T 19/00* (2011.01)
*G09G 5/00* (2006.01)

(52) U.S. Cl.
CPC .......... *G06T 19/006* (2013.01); *G02B 27/017* (2013.01); *G06F 3/012* (2013.01); *G06T 2215/16* (2013.01)

(58) Field of Classification Search
CPC .................................................. G06T 19/006
USPC ........................................................ 345/633
See application file for complete search history.

(56) References Cited

U.S. PATENT DOCUMENTS

| | | | |
|---|---|---|---|
| 7,124,425 B1 * | 10/2006 | Anderson, Jr. .. | H04N 21/21805 348/157 |
| 7,509,215 B2 * | 3/2009 | Shen et al. ................... | 701/438 |
| 7,626,569 B2 * | 12/2009 | Lanier ................... | G06F 1/1601 345/156 |
| 9,066,200 B1 * | 6/2015 | Loxam ................... | H04N 5/232 |
| 2002/0082498 A1 * | 6/2002 | Wendt et al. ................. | 600/411 |
| 2004/0114042 A1 * | 6/2004 | Paolini et al. ........... | 348/207.99 |
| 2006/0038833 A1 * | 2/2006 | Mallinson et al. ........... | 345/633 |
| 2006/0105838 A1 * | 5/2006 | Mullen ................... | A63F 13/00 463/31 |
| 2006/0256110 A1 * | 11/2006 | Okuno ................... | G06F 3/0346 345/419 |
| 2006/0279528 A1 | 12/2006 | Schobben et al. | |
| 2008/0147325 A1 | 6/2008 | Maassel et al. | |

(Continued)

FOREIGN PATENT DOCUMENTS

CN 101243392 A 8/2008
EP 2626303 A1 8/2013

OTHER PUBLICATIONS

"iPAD2 Camera Apps", Retrieved at <<http://teachwithyouripad.wikispaces.com/iPAD2+Camera+Apps>>, Retrieved Date: Apr. 11, 2012, pp. 1-9.

(Continued)

*Primary Examiner* — Javid A Amini
(74) *Attorney, Agent, or Firm* — Alleman Hall Creasman & Tuttle LLP

(57) ABSTRACT

Saving augmented realities includes collecting, with an augmented reality device, observation information of a physical space including an object, and obtaining, with the augmented reality device, an augmentation associated with the object. An augmented view of the physical space including a visual representation of the augmentation is visually presented with the augmented reality device, and the augmented view is saved for subsequent playback.

18 Claims, 3 Drawing Sheets

(56) References Cited

U.S. PATENT DOCUMENTS

| | | | | |
|---|---|---|---|---|
| 2008/0174570 | A1* | 7/2008 | Jobs | G06F 3/0488 345/173 |
| 2009/0167787 | A1* | 7/2009 | Bathiche | A63F 13/10 345/633 |
| 2009/0207322 | A1 | 8/2009 | Mizuuchi et al. | |
| 2010/0194782 | A1* | 8/2010 | Gyorfi | H04W 4/00 345/633 |
| 2011/0018903 | A1* | 1/2011 | Lapstun | G02B 26/06 345/633 |
| 2011/0213664 | A1* | 9/2011 | Osterhout | G02B 27/017 705/14.58 |
| 2011/0216089 | A1* | 9/2011 | Leung | G06T 7/35 345/633 |
| 2011/0221771 | A1* | 9/2011 | Cramer | G06Q 30/02 345/633 |
| 2012/0019547 | A1* | 1/2012 | Tjen | G06T 19/006 345/589 |
| 2012/0142415 | A1* | 6/2012 | Lindsay | H04N 5/2224 463/33 |
| 2012/0207352 | A1* | 8/2012 | Boncyk | G06F 17/30259 382/103 |
| 2012/0249741 | A1* | 10/2012 | Maciocci | G06F 3/011 348/46 |
| 2012/0293548 | A1* | 11/2012 | Perez | G06F 3/012 345/633 |
| 2012/0297014 | A1 | 11/2012 | Lahcanski | |
| 2013/0147837 | A1* | 6/2013 | Stroila | G06T 19/006 345/633 |
| 2013/0178257 | A1* | 7/2013 | Langseth | G06T 17/05 463/4 |
| 2013/0272679 | A1* | 10/2013 | Cavalcanti | H04N 9/87 386/282 |
| 2013/0293584 | A1* | 11/2013 | Anderson | G06T 11/00 345/633 |
| 2013/0342568 | A1* | 12/2013 | Ambrus | G09G 3/003 345/633 |
| 2014/0063055 | A1* | 3/2014 | Osterhout | G06F 3/005 345/633 |
| 2014/0253743 | A1* | 9/2014 | Loxam | H04N 5/232 348/207.1 |
| 2015/0123966 | A1* | 5/2015 | Newman | G06T 19/006 345/419 |
| 2016/0124501 | A1 | 5/2016 | Lam et al. | |

OTHER PUBLICATIONS

Rekimoto, et al., "The World through the Computer: Computer Augmented Interaction with Real World", Retrieved at <<http://www.sonycsl.co.jp/person/rekimoto/papers/uist95.pdf>>, Proceedings of the 8th annual ACM symposium on User interface and software technology, Nov. 14, 1995, pp. 29-36.

Sarvas, et al., "Metadata Creation System for Mobile Images", Retrieved at <<http://fusion.sims.berkeley.edu/GarageCinema/pubs/pdf/pdf_6C19FBDD-ED79-4E9C-87AAF80D9AFA828F.pdf>>, Proceedings of the 2nd international conference on Mobile systems, applications, and services, Jun. 6, 2004, pp. 36-48.

Doherty, et al., "Automatically Augmenting Lifelog Events Using Pervasively Generated Content from Millions of People", Retrieved at <<www.mdpi.com/1424-8220/10/3/1423/pdf>>, Sensors Journal, vol. 10, No. 3, 2010, pp. 1423-1446.

ISA European Patent Office, International Search Report of PCT/US2013/046431, dated Aug. 13, 2013, WIPO, 8 pages.

European Patent Office, Extended European Search Report Issued in European Patent Application No. 13197842.1, dated Jun. 12, 2014, 7 Pages.

Correia, et al., "HyperMem: A System to Store and Replay Experiences in Mixed Reality Worlds", In International Conference on Cyberworlds, Nov. 23, 2005, pp. 83-92.

Ivetic, et al., "Augmented AVI Video File for Road Surveying", Computers & Electrical Engineering, vol. 36, Issue 1, Jan. 2010, pp. 169-179.

State Intellectual Property Office of the People's Republic of China, First Office Action and Search Report Issued in Patent Application No. 201310757228.0, dated Jun. 1, 2016, 12 Pages.

United States Patent and Trademark Office, Non-Final Office Action Issued in U.S. Appl. No. 14/749,184, dated Oct, 20, 2016, 12 pages.

The International Bureau of WIPO, International Preliminary Report on Patentability issued in Application No. PCT/US2013/046431, dated Jan. 8, 2015, Switzerland, 6 Pages.

"Third Office Action Issued in Chinese Patent Application No. 201310757228.0", dated Sep. 13, 2017, 8 Pages.

"Non-final Office Action Issued in U.S Appl. No. 14/749,184", dated Sep. 1, 2017, 12 Pages.

"Final Office Action Issued in Chinese Patent Application No. 201310757228.0", dated Apr. 10, 2018, 6 Pages.

"Final Office Action Issued in U.S. Appl. No. 14/749,184", dated Jan. 31, 2018, 13 Pages.

"Office Action Issued in European Patent Application No. 13197842. 1", dated Sep. 13, 2018, 5 Pages.

* cited by examiner

SAVING AUGMENTED REALITIES

BACKGROUND

Augmented reality devices are configured to display one or more images over a physical space in order to provide an augmented view of the physical space to a user. The augmented views of the physical space may provide desired information to the user about one or more objects in the physical space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for saving augmented realities are provided. In one example embodiment, a method for saving augmented realities includes collecting, with an augmented reality device, observation information of a physical space including an object, and obtaining, with the augmented reality device, an augmentation associated with the object. An augmented view of the physical space including a visual representation of the augmentation may be visually presented with the augmented reality device, and the augmented view may be saved for subsequent playback.

DETAILED DESCRIPTION

An augmented reality device may present augmented views of a physical space to a user. According to embodiments disclosed herein, the augmented views presented to the user may be saved by the augmented reality device for later playback. The augmented views may include augmentations of objects in the physical space, such as the names of people in the physical space.

Figure 1:
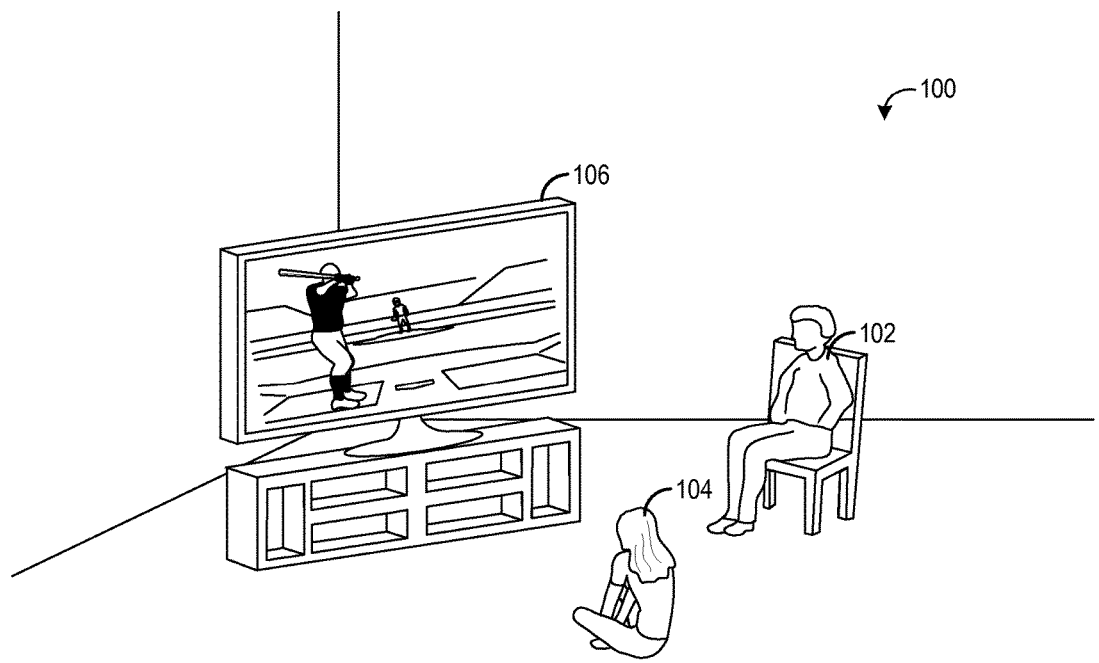
FIG. 1 shows an example physical space including one or more objects that may be viewed through an augmented reality device.

Turning to FIG. 1, an example physical space 100 that may be viewed through an augmented reality device is depicted. Physical space 100 includes multiple objects, including a first person 102 and a second person 104. Additionally, physical space 100 includes a television 106 on which first person 102 and second person 104 are watching a baseball game.

Figure 2:
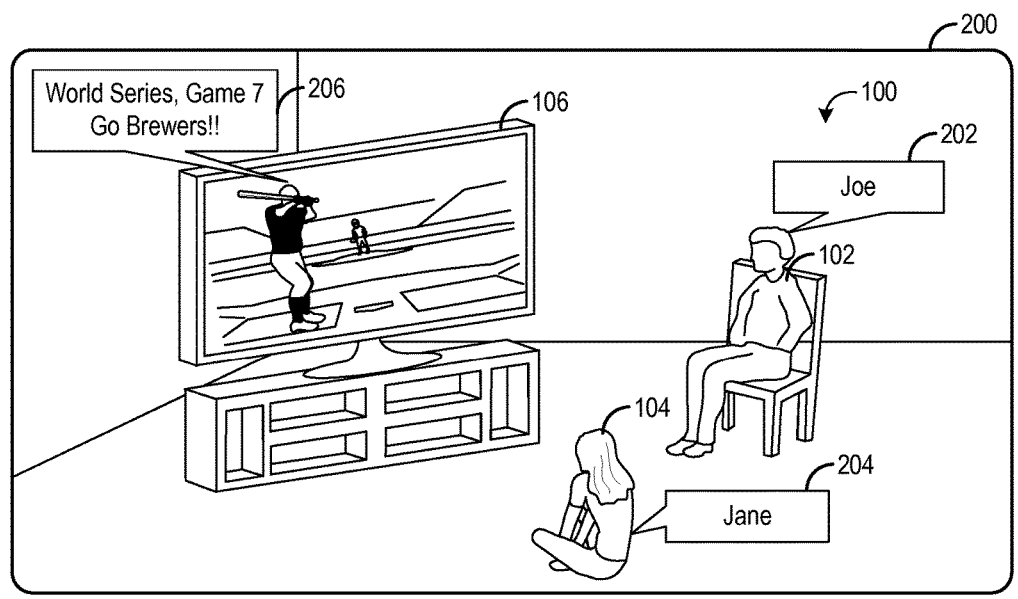
FIG. 2 shows an example augmented view of the physical space of FIG. 1 saved for subsequent playback.

FIG. 2 illustrates an example augmented view 200 of physical space 100. When physical space 100 is viewed by a user through an augmented reality device (e.g., augmented reality device 400 of FIG. 4), the augmented reality device may be configured to display one or more images overlaid on top of the physical space. By doing so, an augmented view of the physical space is provided to the user. The augmented reality device may include a see-through display such that the images are displayed on the see-through display and the physical space is simultaneously viewed by the user through the see-through display. In other embodiments, the augmented reality device may include a standard display that displays an image of the physical space and the one or more augmented images together. Additional information regarding the augmented reality device will be described below with respect to FIGS. 4 and 5.

Physical space 100 may be augmented with any suitable image or images. In one example, objects within the physical space may be tagged, or annotated, with information that is visually represented in the augmented view. As non-limiting examples, people, objects, and events within the physical space may be tagged with information such as names, dates, or other information.

As shown in FIG. 2, physical space 100 has been augmented by an augmented reality device with multiple overlaid images. For example, first person 102 has been tagged with a first augmentation 202 indicating that the name of first person 102 is Joe. Similarly, second person 104 has been tagged with a second augmentation 204 indicating that the name of the second person 104 is Jane. Television 106 has been tagged with a third augmentation 206 indicating that the baseball game is game 7 of the World Series.

The augmentations may be obtained from a variety of sources. The augmented reality device may collect observation information, such as image information from image sensors, location information from a GPS system, and motion information from a motion sensor. The observation information may be used by the augmented reality device or by a remote service to identify objects in the physical space. Augmentations specific to identified objects may then be obtained from an index stored on the augmented reality device, by the remote service, or from other devices.

An augmentation may be obtained from a device within or outside of the physical space. For example, an augmentation may be obtained from a device associated with a particular person, such as the person's computer, phone, augmented reality device, etc. As an example, the augmented reality device displaying the augmented reality with the augmentation may communicate with the device of first person 102 to receive first augmentation 202. As another example, an augmentation may also be obtained from a device that is not associated with a particular person. For example, television 106 may send third augmentation 206 to the augmented reality device displaying the augmented reality with the augmentation. As yet another example, the augmented reality device may obtain an augmentation from a remote service. For example, first person 102 may post a message to a social networking site, and the augmented reality device may be configured to retrieve the message to use as third augmentation 206.

First augmentation 202, second augmentation 204, and third augmentation 206 are visually represented in FIG. 2 as call-out bubbles including textual information. However, any visual representation of the augmentations is within the scope of this disclosure. For example, the augmentations could include pictures, symbols, animations, movies, audio or any other suitable representations of the augmentations. Further, the physical space may be augmented with augmentations such as images of other objects, people, etc.

The augmented view of the physical space may be captured to form a saved augmented view for subsequent playback. In the illustrated example, the saved augmented view includes a visual representation of physical space 100, first augmentation 202, second augmentation 204, and third augmentation 206 as viewed by the user through the augmented reality device. The first augmentation 202, second augmentation 204, and third augmentation 206 may be captured so as to appear at a position within physical space 100 that is the same as and/or similar to the position the augmentations appear when viewed through the augmented reality device.

The augmented view may be saved in a variety of different formats without departing from the scope of this disclosure. As nonlimiting examples, the augmented view may be saved as a digital image, a digital movie, a three-dimensional reconstruction, and/or other machine-readable representation of the augmented view.

Figure 3:
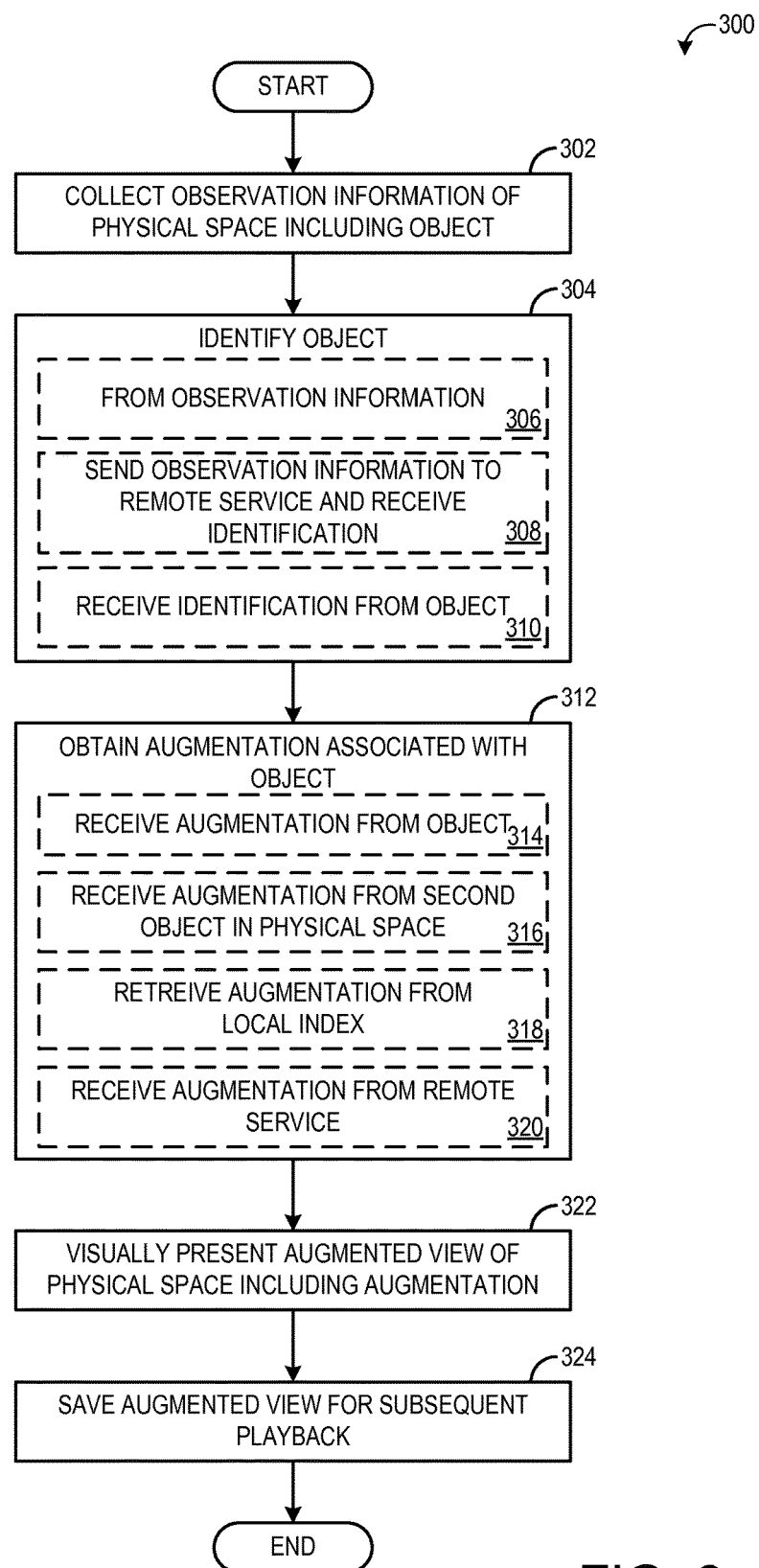
FIG. 3 is a flow chart illustrating a method for saving augmented realities according to an embodiment of the present disclosure.

FIG. 3 illustrates a method 300 for saving augmented realities according to an embodiment of the present disclosure. Method 300 may be carried out by an augmented reality device, such as the HMD device described below with respect to FIG. 4 or the computing system described with respect to FIG. 5.

At 302, method 300 includes collecting observation information of a physical space including an object. The observation information may include image information, audio information, location information, and/or additional information about the physical space. The observation information may be collected from sensors coupled to the augmented reality device. For example, the observation information may be collected by one or more of a color image sensor, depth camera, microphone, compass, motion sensor, and GPS system.

At 304, the object in the physical space is identified. The object may be identified by the augmented reality device from the observation information, as indicated at 306. For example, the augmented reality device may be configured to perform scene analysis, face recognition, and/or other identification mechanisms using the observation information in order to identify the object in the physical space. In some embodiments, identifying the object may include sending the observation information to a remote service and receiving the object identification from the remote service, at 308. In other embodiments, identifying the object may include receiving the identification of the object from the object at 310. Receiving the identification from the object includes receiving the identification from a device associated with the object. For example, the object may be a person, and the identification of the object may be received from a computing device that belongs to the person.

At 312, method 300 includes obtaining an augmentation associated with the object. The augmentation may include information related to the object, such as a name of a person. The augmentation may be obtained automatically by the augmented reality device in response to identification of the object. However, in other embodiments, the augmentation may be obtained in response to a user request, such as a user-issued voice command or input to an input device.

In one embodiment, the augmentation may be received from the object at 314. As explained above with respect to FIG. 2, the object may have a computing device associated with it, or the object may be a computing device, and the computing device may send the augmentation to the augmented reality device. In another embodiment, the augmentation may be received from a second object in the physical space at 316. As described above, a device belonging to one person in the physical space may send an augmentation about another object (e.g., the baseball game occurring on the television in the example of FIG. 2) to the augmented reality device.

In some embodiments, the augmentation may be retrieved from a storage location local to the augmented reality device, such as an augmentation index, as indicated at 318. For example, the augmented reality device may store information, input by a user or received from a remote service, relating to one or more previously identified objects, and then retrieve the information upon a subsequent identification of the objects. In other embodiments, the augmentation may be received from a remote service, as indicated at 320. Receiving the augmentation from a remote service may include sending observation information to the remote service and receiving an object identification and the augmentation from the remote service, or it may include sending a request to the remote service for an augmentation relating to an already-identified object.

At 322, an augmented view of the physical space including a visual representation of the augmentation is visually presented to the user of the augmented reality device. Presenting the augmented view may include displaying the visual representation of the augmentation on a see-through display. The visual representation of the augmentation may be displayed on the see-through display such that the augmentation is overlaid on or near the object with which it is associated when the user looks through the see-through display. In other embodiments, presenting the augmented view may include sending the visual representation of the augmentation and an image of the physical space to a common display to be displayed together.

At 324, the augmented view is saved for subsequent playback. The saved augmented view may include an augmented still photograph, augmented video, augmented audio, and/or additional forms of augmented media that may be saved for viewing at a later time. The augmented view may be saved in response to a user request or other instruction to save the augmented view and/or the augmented view may be saved automatically.

Saving the augmented view may include capturing an image of the physical space using one or more outward-facing image sensors (e.g., visible light cameras) and at substantially the same time, saving a visual representation of the augmentation that is being displayed. The visual representation of the augmentation may then be overlaid on the captured image of the physical space to form the saved augmented view. Other mechanisms for saving the augmented view are also within the scope of this disclosure. For example, the visual representation of the augmentation and the physical space may be captured together (particularly if they appear together on a common display) rather than being captured separately.

Figure 4:
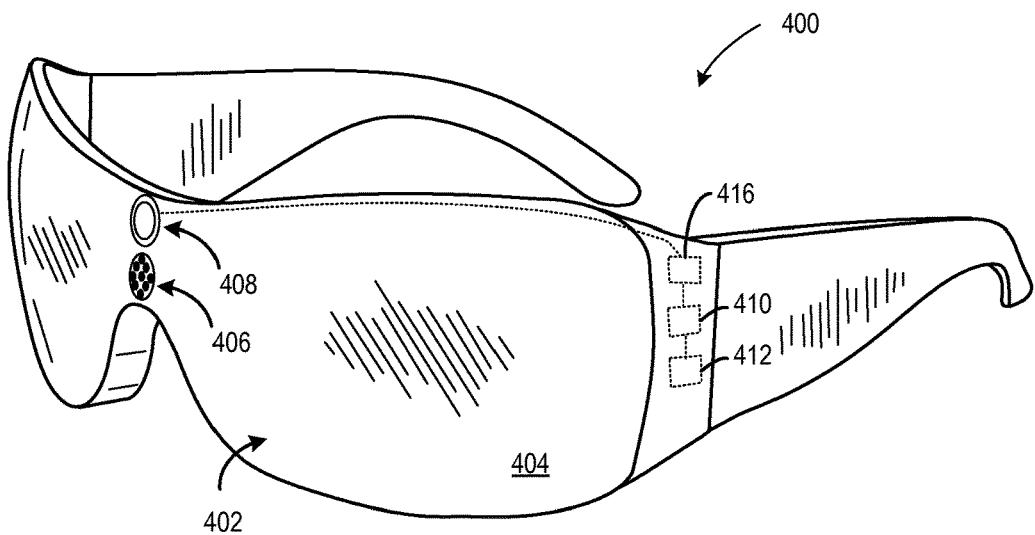
FIG. 4 schematically shows an example augmented reality device according to an embodiment of the present disclosure.

FIG. 4 shows an example embodiment of a head-mounted see-through display (HMD) device 400, which is an example of an augmented reality device that may be used to save an augmented view for later playback. HMD device 400 takes the form of a pair of wearable glasses. In some embodiments, the HMD device may have another suitable form in which a see-through display system is supported in front of a viewer's eye or eyes. In still other embodiments, the augmented reality device may not include a see-through display, but may instead take the form of a camera, mobile phone, or other device.

HMD device 400 includes various sensors and output devices. For example, as shown, HMD device 400 includes a see-through display subsystem 402 configured to deliver images to the eyes of a user. As one nonlimiting example, display subsystem 402 may include image-producing elements (e.g. see-through OLED displays) located within lenses 404. As another example, the display subsystem may include a light modulator on an edge of the lenses, and the lenses may serve as a light guide for delivering light from the light modulator to the eyes of a user. Because lenses 404 are at least partially transparent, light may pass through the lenses to the eyes of a user, thus allowing the user to see through the lenses.

HMD device 400 also includes one or more image sensors. For example, HMD device 400 may include at least one inward facing sensor 406 and/or at least one outward facing sensor 408. Inward facing sensor 406 may be an eye tracking image sensor configured to acquire image data to allow a viewer's eyes to be tracked.

Outward facing sensor 408 may include a depth camera, a visible light camera, an infrared light camera, and/or another position tracking camera. Further, such outwardly facing cameras may have a stereo configuration. For example, the HMD device may include two depth cameras to observe the physical space in stereo from two different angles of the user's perspective. Further, outward facing image sensor 408 may capture images of a physical space, which may be provided as input to a 3D modeling system. By observing the physical space using outward facing image sensor 408 HMD device 400 and/or a cooperating remote service may be able to identify one or more objects in the physical space.

As described above, such a system may be used to generate a 3D model of the physical space. In some embodiments, the HMD device may include an infrared projector to assist in structured light and/or time of flight depth analysis. For example, the HMD device may include more than one sensor system to generate the 3D model of the physical space. In some embodiments, the HMD device may include depth sensing via a depth camera as well as light imaging via an image sensor that includes visible light and/or infrared light imaging capabilities.

HMD device 400 also may include one or more motion sensors 410 to detect movements of a viewer's head when the viewer is wearing the HMD device. Motion sensors 410 may output motion data for tracking viewer head motion and eye orientation, for example. As such motion data may facilitate detection of tilts of the user's head along roll, pitch and/or yaw axes (i.e., orientation information). Further, motion sensors 410 may enable position tracking of the HMD device to determine a position of the HMD device within a physical space. Likewise, motion sensors 410 may also be employed as user input devices, such that a user may interact with the HMD device via gestures of the neck and head, or even of the body. Non-limiting examples of motion sensors include an accelerometer, a gyroscope, a compass, and an orientation sensor, which may be included as any combination or sub-combination thereof. Further, the HMD device may be configured with global positioning system (GPS) capabilities.

The HMD device may also include one or more microphones 412 to allow the use of voice commands as user inputs. Additionally or alternatively, one or more microphones separate from the HMD device may be used to detect viewer voice commands. For example, the input received from microphones 412 may be used to identify a voice of a person in the physical space viewed through the HMD device. The voice recognition may then be used to identify the person in order to obtain an augmentation related to the person. In another example, input from microphones 412 may be used to identify other sounds, such as the identification of a song. It will be understood that the sensors illustrated in FIG. 4 are shown by way of example and thus are not intended to be limiting in any manner, as any other suitable sensors and/or combination of sensors may be utilized. For example, an inertial measurement unit may also be included with the HMD device in order to determine a point of view of the viewer to facilitate placement of the augmentations on the see-through display.

The HMD device further includes a controller 414 having a logic subsystem and a storage subsystem in communication with the various input and output devices of the HMD device, examples of which are discussed in more detail below with respect to FIG. 5. Briefly, the storage subsystem may include instructions that are executable by the logic subsystem, for example, to receive and process inputs from the sensors, and to optionally send such inputs to a remote computing system (in unprocessed or processed form) via a communications subsystem, and to present images to the viewer via see-through display subsystem 402. Audio may be presented via one or more speakers on the HMD device, or via another audio output within the physical space.

It will be appreciated that the HMD device is provided by way of example, and thus is not meant to be limiting. Therefore it is to be understood that the HMD device may include additional and/or alternative sensors, cameras, microphones, input devices, output devices, etc. than those shown without departing from the scope of this disclosure. Further, the physical configuration of an HMD device and its various sensors and subcomponents may take a variety of different forms without departing from the scope of this disclosure.

In some embodiments, the methods and processes described above may be tied to a computing system of one or more computing devices. In particular, such methods and processes may be implemented as a computer-application program or service, an application-programming interface (API), a library, and/or other computer program product.

Figure 5:
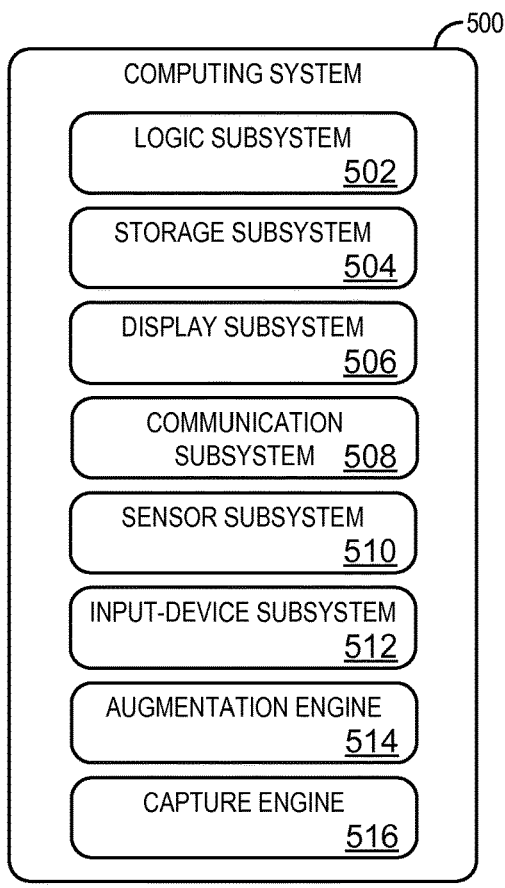
FIG. 5 schematically shows a non-limiting computing system.

FIG. 5 schematically shows a non-limiting embodiment of a computing system 500 that can enact one or more of the methods and processes described above. Computing system 500 may represent HMD device 400, a computing system separate from HMD device 400 but communicatively coupled to the HMD device, such as the remote service discussed above with respect to FIG. 3, a mobile computing system configured to display an augmented view of a physical space, and/or any other suitable computing system. Computing system 500 is shown in simplified form. It will be understood that virtually any computer architecture may be used without departing from the scope of this disclosure. In different embodiments, computing system 500 may take the form of an augmented reality device, mainframe computer, server computer, desktop computer, laptop computer, tablet computer, home entertainment computer, network computing device, gaming device, mobile computing device, mobile communication device (e.g., smart phone), etc.

Computing system 500 includes a logic subsystem 502 and a storage subsystem 504. Computing system 500 may optionally include a display subsystem 506, input-device subsystem 512, communication subsystem 508, augmentation engine 514, capture engine 516, and/or other components not shown in FIG. 5. Computing system 500 may also optionally include or interface with one or more user-input devices such as a keyboard, mouse, game controller, camera, microphone, and/or touch screen, for example. Such user-input devices may form part of input-device subsystem 512 or may interface with input-device subsystem 512.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 504 includes one or more physical, non-transitory, devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 504 may include volatile, nonvolatile, dynamic, static, read/write, read-only, random access, sequential access, location-addressable, file-addressable, and/or content-addressable devices. In some embodiments, logic subsystem 502 and storage subsystem 504 may be integrated into one or more unitary devices, such as an application-specific integrated circuit (ASIC), or a system-on-a-chip.

It will be appreciated that storage subsystem 504 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 500 that is implemented to perform a particular function. In some cases, such a module, program, or engine may be instantiated via logic subsystem 502 executing instructions held by storage subsystem 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input-device subsystem 512 may comprise or interface with one or more user-input devices such as a keyboard, mouse, touch screen, or game controller. In some embodiments, the input-device subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 508 may be configured to communicatively couple computing system 500 with one or more other computing devices. Communication subsystem 508 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Sensor subsystem 510 may include one or more sensors configured to sense different physical phenomenon (e.g., visible light, infrared light, acceleration, orientation, position, etc.), as described above. For example, the sensor subsystem 510 may comprise one or more image sensors, motion sensors such as accelerometers, touch pads, touch screens, inertial measurement units, and/or any other suitable sensors. Therefore, sensor subsystem 510 may be configured to provide observation information to logic subsystem 502, for example. As described above, observation information such as image data, motion sensor data, and/or any other suitable sensor data may be used to perform such tasks as determining a particular gesture performed by the one or more human subjects.

In some embodiments, sensor subsystem 510 may include a depth camera (e.g., sensor 408 of FIG. 4). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernible from the relative amounts of light received in corresponding pixels of the two cameras.

In some embodiments, sensor subsystem 510 may include a visible light camera. Virtually any type of digital camera technology may be used without departing from the scope of this disclosure. As a non-limiting example, the visible light camera may include a charge coupled device image sensor.

When included, augmentation engine 514 may be configured to obtain one or more augmentations associated with identified objects. Augmentation engine 514 may include an index or other system to store previously received augmentations. Alternatively or additionally, augmentation engine 514 may send a request via communication subsystem 508 to an outside device, such as a remote service, to receive an augmentation relating to an identified object. Augmentation engine 514 may then send a visual representation of the augmentation to display subsystem 506.

When included, capture engine 516 may be configured to save an augmented view of a physical space including a visual representation of one or more augmentations. Capture engine 516 may receive multiple image feeds including a feed from one or more image sensors and/or a feed going to or coming from display subsystem 506. Capture engine 516 may save the feeds and compile them into a saved augmented view. Alternatively or additionally, capture engine 516 may be configured to capture an image of an augmented view sent to display subsystem 506. Capture engine 516 may save the augmented views as still images (e.g., photographs) or moving pictures (e.g., videos).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for saving augmented realities, comprising:
obtaining, with an augmented reality device, a virtual augmentation;
displaying the virtual augmentation with a display of the augmented reality device, the virtual augmentation augmenting a live view of a physical space;
sighting the physical space with a camera of the augmented reality device as the virtual augmentation augments the live view of the physical space;
in response to a user request during use of the augmented reality device, saving an augmented reality recreation having a beginning determined by the user request and having an ending determined by the user request or a subsequent user request, the augmented reality recreation including the virtual augmentation visually embedded within video of the live view captured by the camera; and
outputting the augmented reality recreation as a digital video, the digital video displayable on a display device not communicatively coupled with a camera, wherein the augmented reality recreation simulates an augmented view the user had through the display when the augmented reality recreation was previously saved.

2. The method of claim 1, wherein obtaining the virtual augmentation further comprises receiving the virtual augmentation from an object in the physical space.

3. The method of claim 1, wherein the virtual augmentation augments an object in the physical space.

4. The method of claim 1, wherein obtaining the virtual augmentation further comprises retrieving the virtual augmentation from an augmentation index stored on the augmented reality device.

5. The method of claim 1, wherein obtaining the virtual augmentation further comprises retrieving the virtual augmentation from a remote service.

6. The method of claim 1, wherein obtaining the virtual augmentation further comprises sending observation information including video captured by the camera to a remote service, and receiving the virtual augmentation from the remote service.

7. The method of claim 2, wherein the object is a person, and wherein the augmentation is textual information indicating an identity of the person.

8. The method of claim 6, wherein the observation information comprises image information, audio information, and location information of the physical space.

9. The method of claim 6, wherein the observation information is collected by one or more of an outward facing image sensor, motion sensor, microphone, compass, and GPS.

10. An augmented reality device, comprising:
one or more cameras to sight a physical space;
an augmentation engine to obtain a virtual augmentation for an identified object in the physical space, the virtual augmentation comprising information indicating an identity of the identified object, the virtual augmentation obtained from a device located within the physical space;

a display to present a visual representation of the virtual augmentation, the virtual augmentation augmenting a live view of the physical space; and a capture engine to save an augmented reality recreation having a user-controlled beginning and ending, the augmented reality recreation including the virtual augmentation visually embedded within video of the live view captured by the one or more cameras and output the augmented reality recreation as a digital video, the digital video displayable on a display device not communicatively coupled with a camera, wherein the augmented reality recreation simulates an augmented view the user had through the display when the augmented reality recreation was previously saved.

11. The augmented reality device of claim 10, wherein the identified object is identified by the augmented reality device from image information collected from the one or more cameras.

12. The augmented reality device of claim 10, wherein the identified object is identified by a remote service from image information collected from the one or more cameras.

13. The augmented reality device of claim 10, wherein the capture engine receives an image of the physical space from the one or more cameras and is configured to overlay the visual representation of the virtual augmentation on the image of the physical space.

14. The augmented reality device of claim 10, wherein the display is a see-through display.

15. A method for saving augmented realities, comprising:
collecting, with an augmented reality device, observation information of a physical space including an object;

sending, with the augmented reality device, the observation information to a remote service via a network;

receiving, with the augmented reality device, an identification of the object and a virtual augmentation associated with the object from the remote service;

displaying the virtual augmentation with a display of the augmented reality device, the virtual augmentation augmenting a live view of the physical space;

in response to a user request during use of the augmented reality device, saving an augmented reality recreation having a beginning determined by the user request and having an ending determined by the user request or a subsequent user request, the augmented reality recreation including the virtual augmentation visually embedded within video of the live view of the physical space; and outputting the augmented reality recreation as a digital video, the digital video displayable on a display device not communicatively coupled with a camera, wherein the augmented reality recreation simulates an augmented view the user had through the display when the augmented reality recreation was previously saved.

16. The method of claim 15, wherein the object is a person, and wherein the virtual augmentation is textual information indicating an identity of the person.

17. The method of claim 15, wherein the observation information comprises image information, audio information, and location information of the physical space collected by one or more of a camera, motion sensor, microphone, compass, and GPS.

18. The method of claim 14, wherein the augmented reality device is a head-mounted see-through display device.

* * * * *